United States Patent Office 3,423,412
Patented Jan. 21, 1969

3,423,412
BENZOPYRROLOQUINAZOLINONES
Edward C. Taylor, Princeton, N.J., and Youval Shvo, Rehovoth, Israel (both of 1500 Spring Garden St., Philadelphia, Pa. 19101)
No Drawing. Filed Nov. 21, 1966, Ser. No. 595,583
U.S. Cl. 260—251                 6 Claims
Int. Cl. C07d 51/48

This invention relates to certain diazasteroid compounds and to intermediates for their preparation. In particular, the invention relates to a particular 12,14-diazasteroid having estrogenic activity and to various intermediates therefor.

(II), 2,3 - dihydro - 8 - methoxybenzo[f]pyrrolo[1,2 - a]-quinazolin-11(1H)-one (III), N-(1-cyano-6-methoxy-2-naphthyl)-2-pyrrolidinone (IV), 4-chloro-N-(1-cyano-6-methoxy - 2 - naphthyl)butyramide (V), and 2 - amino 1-cyano-6-methoxynaphthalene (VI).

The following diagram illustrates schematically the preparation of the intermediate and product compounds of the invention.

The starting material for their preparation is 6-methoxy-2-naphthylamine [VII, J. Chem. Soc. 366 (1956)]. This compound is carefully brominated in glacial acetic acid, and the crude bromination product acetylated with acetic anhydride in pyridine. Recrystallization of the acet-

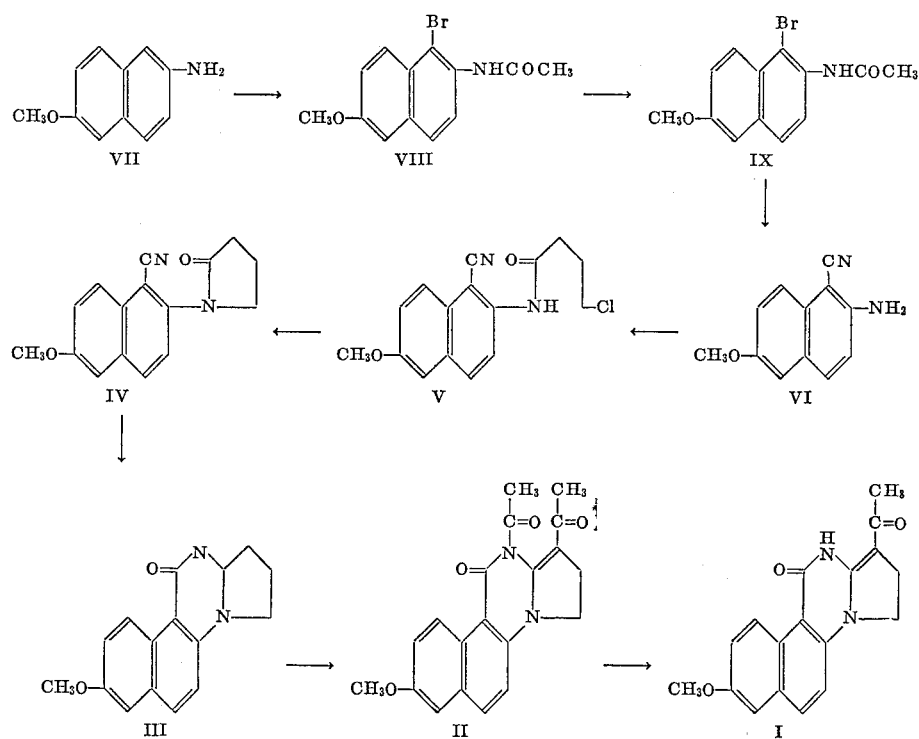

The invention is particularly concerned with the compound 1 - acetyl - 2,3 - dihydro - 8 - methoxybenzo[f]pyrrolo[1,2-a]-quinazolin-11(12H)-one (I).

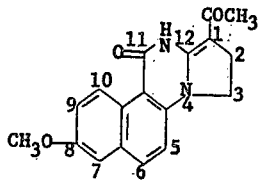

.I

Compound I may also be named, using steroid nomenclature, as 17 - acetyl - 3 - methoxy - 18 - nor - 12,14-diazaestra - 1,3,5(10),6,8,13(17) - hexaene or 3 - methoxy - 18 - nor - 12,14 - diazapregna - 1,3,5(10),6,8, 13(17)-hexaen-20-one. The present inventors believe that compound I and intermediates II and III represent the first compounds heretofore prepared having the particular diazasteroid ring skeleton.

Also part of the invention are certain intermediate compounds useful in preparing compound I. Among these compounds are 1,12 - diacetyl - 2,3 - dihydro - 8 - methoxybenzo[f]pyrrolo[1,2 - a] - quinazolin - 11(12H) - one ylation product yields an ethanol-insoluble dibromo compound and an ethanol-soluble monobromo compound (VIII). Reaction of the monombromo compound with cuprous cyanide in anhydrous pyridine gives the 1-cyano compound IX. Aqueous alkaline hydrolysis of IX gives the amino nitrile VI. Reaction of this compound with 4-chlorobutyryl chloride gives the butyramide V, which is cyclized to the pyrrolidinone IV with sodium methoxide in ethanol. Subsequent reaction of the pyrrolidinone with dry hydrogen chloride in anhydrous ethanol results in smooth cyclization to the diazasteroid III. When this compound is heated in a mixture of acetic anhydride and pyridine, the diacetyl derivative II is obtained. Mild alkaline hydrolysis of II selectively cleaves the N-acetyl group to give the final product I.

Compound I has estrogenic activity and has been demonstrated to give activity in rats at a dose of 20 mg./kg., when administered subcutaneously in a sesame oil formulation. This compound is formulated for parenteral or oral use by combining it with standard pharmaceutical excipients in a manner similar to that used in formulating other estrogenic agents.

Also part of the invention are the pharmaceutically acceptable acid addition salts of compound I. These salts include the hydrochloride, hydrobromide, sulfate, and maleate, and are prepared in the conventional manner by combination of the basic compound and the acid, usually in the form of ethereal, alcoholic, or acetone solutions.

It will also be apparent to one skilled in the art of medicinal chemistry that certain obvious variants may be employed at particular stages of the synthetic sequence in order to obtain products with corresponding structures. These variants include use of a 6-ethoxy or 6-propoxynaphthylamine in place of 6-methoxy-2-naphthylamine in order to obtain diazasteroids with the appropriate 8-alkoxy group. Naphthylamines bearing substituents at other positions may also be used. Also, a substituted 4-chlorobutyramide may be used instead of the unsubstituted compound in order to obtain compounds having a correspondingly substituted 5-membered pyrrole ring. Finally, acylation with lower acyl groups other than acetyl will result in the corresponding 1-acyl product. Since all of the above variants are obvious to one skilled in the art, they are considered equivalent to the invention as specifically claimed.

The following examples illustrate the preparation of the compounds of the invention, but are not to be construed as limiting the scope of the invention.

EXAMPLE I 2-acetamido-1-bromo-6-methoxynaphthalene

To a stirred, cooled solution of 23.5 g. (0.14 mole) of 2-amino-6-methoxynaphthalene in 100 ml. of glacial acetic acid was added slowly, and over a period of 30 min., a solution of 22 g. (0.14 mole) of bromide in 50 ml. of glacial acetic acid. Immediate precipitation occurred when the bromine was added. After addition was complete, the precipitated solid was collected by filtration, washed well with acetic acid followed by ether, and the crude product (46 g.) acetylated at room temperature with a mixture of 50 ml. of anhydrous pyridine and 100 ml. of acetic anhydride. After standing overnight at room temperature, the acetylation mixture deposited a crystalline solid which was collected by filtration and washed well with ethanol, followed by ether; yield 27 g., M.P. 165–173°. This crude product, which was a mixture of mono- and dibromo products, was separated by leaching with ethanol. The ethanol extracts upon concentration yielded 17.7 g. (47%) of 2-acetamido - 1 - bromo-6-methoxynaphthalene, M.P. 177–182°. Recrystallization from ethanol raised the melting point to 183–186°.

Analysis.—Calcd. for $C_{13}H_{12}NO_3Br$: C, 53.08; H, 4.11; N, 4.76. Found: C, 51.68; H, 4.01; N, 4.52.

EXAMPLE 2

2-acetamido-1-cyano-6-methoxynaphthalene

A mixture of 32 g. of 2-acetamido-1-bromo-6-methoxynaphthalene, 13 g. of cuprous cyanide (freshly prepared) and 20 ml. of anhydrous pyridine was heated in an oil bath at 200° for 3 hr. The hot black reaction mixture was poured with vigorous stirring into 2 l. of 5 N aqueous ammonium hydroxide. The resulting suspension was stirred for 2.5 hr. and the brown solid filtered off, washed with dilute ammonium hydroxide and water and dried. Recrystallization of the crude product from aqueous ethanol gave 2-acetamido-1-cyano-6-methoxynaphthalene as colorless crystals, M.P. 198–200°, in 57% yield.

EXAMPLE 3

2-amino-1-cyano-6-methoxynaphthalene

A suspension of 10.0 g. of 2-acetamido-1-cyano-6-methoxynaphthalene in 140 ml. of 1 N sodium hydroxide solution was heated under reflux with vigorous stirring for 30 min.; extensive foaming occurred. The resulting suspension was cooled, filtered, and the collected solid washed with dilute sodium hydroxide solution followed by water to give 7.8 g. (94%), M.P. 203–207°; the melting point was raised to 205–207° by recrystallization from ethyl acetate.

Analysis.—Calcd. for $C_{12}H_{10}N_2O$: C, 72.71; H, 5.09; N, 14.13. Found: C, 72.54; H, 5.02; N, 13.97.

EXAMPLE 4

4-chloro-N-(1-cyano-6-methoxy-2-naphthyl)butyramide

To a suspension of 5.4 g. of 2-amino-1-cyano-6-methoxynaphthalene in 50 ml. of anhydrous pyridine was added slowly and with stirring 7.5 g. of freshly distilled 4-chlorobutyryl chloride. The reaction mixture was allowed to stand at room temperature overnight, poured over ice, and the solid which separated collected by filtration, washed with water, and recrystallized from ethanol; yield, 5.1 g. (61%), M.P. 158–165°. Recrystallization from ethanol then gave while needles, M.P. 168–170°.

Analysis.—Calcd. for $C_{16}H_{15}N_2O_2Cl$: C, 63.3; H, 4.98; N, 9.25. Found: C, 63.3; H, 5.08; N, 9.14.

EXAMPLE 5

N-(1-cyano-6-methoxy-2-naphthyl)-2-pyrrolidinone

To a suspension of 2.7 g. of 4-chloro-N-(1-cyano-6-methoxy-2-naphthyl)butyramide in 90 ml. of anhydrous ethanol was added 3.6 g. of sodium methoxide. The mixture became homogenous and turned pale yellow, and after a few minutes a colorless solid started to separate. The mixture was left overnight at room temperature, neutralized with acetic acid, diluted with 150 ml. of water, and filtered. The collected solid was washed well with water and recrystallized from ethanol (charcoal) to give 1.8 g. (76%) of shiny plates, M.P. 165–167°. Recrystallization from ethanol sharpened the melting point to 166–167°.

Analysis.—Calcd. for $C_{16}H_{14}N_2O_2$: C, 72.16; H, 5.30; N, 10.52. Found: C, 72.10; H, 5.07; N, 10.56.

EXAMPLE 6

2,3-dihydro-8-methoxybenzol[f]pyrrolo[1,2-a]quinazolin-11(1H)-one

Dry hydrogen chloride gas was passed for a period of 2.5 hrs. at room temperature through a suspension of 1.8 g. of N-(1-cyano-6-methoxy-2-naphthyl)-2-pyrrolidinone in 120 ml. of anhydrous ethanol. The reaction mixture was finally heated under reflux for 30 min., cooled, and the precipitated solid filtered off and washed well with ethanol; yield of the hydrochloride, 1.88 g. (92%). This material was dissolved in 100 ml. of hot water and 1.8 g. of sodium acetate added; the crystalline colorless product which separated on cooling was filtered, washed with water, and recrystallized from a mixture of ethanol and dimethylformamide to give colorless crystals, M.P. 260–270° dec.

Analysis.—Calcd. for $C_{16}H_{14}N_2O_2$: C, 72.16; H, 5.30; N, 10.52. Found: C, 71.96; H, 5.39; N, 10.28.

EXAMPLE 7

1,12-diacetyl-2,3-dihydro-8-methoxy-benzo[f]pyrrolo[1,2-a]quinazolin-11(12H)-one A suspension of 2.1 g. of 2,3-dihydro-8-methoxybenzo[f]pyrrolo[1,2-a]quinazolin-11(1H)-one in 21 ml. of anhydrous pyridine and 21 ml. of acetic anhydride was heated under reflux for 1 hr., whereupon it became homogeneous. The reaction mixture was cooled to 0° and filtered, and the collected solid washed by water followed by ethanol and recrystallized from dimethylformamide to give 1.45 g. (60%) of pale yellow needles, M.P. 268–270° dec.

Analysis.—Calcd. for $C_{20}H_{18}N_2O_4$: C, 68.56; H, 5.18; N, 8.00. Found: C, 68.77; H, 5.34; N, 8.22.

EXAMPLE 8

1-acetyl-2,3-dihydro-8-methoxybenzo[f]pyrrolo[1,2-a]-quinazolin-11(12H)-one

A suspension of 4.52 g. of 1,12-diacetyl-2,3-dihydro-8-methoxybenzo[f]pyrrolo[1,2 - a]quinazolin - 11(12H)- one, 4.50 g. of sodium methoxide and 300 ml. of anhydrous ethanol was stirred under nitrogen at room temperature for 4.5 hrs. The reaction mixture was then neutralized with acetic acid, cooled and filtered to give 3.9 g. (98%). Recrystallization from dimethylformamide gave yellow needles, M.P. 272–275°.

*Analysis.*—Calcd. for $C_{18}H_{16}N_2O_3$: C, 70.11; H, 5.23; N, 9.09. Found: C, 70.32; H, 5.25; N, 9.26.

We claim:
1. A compound of the formula

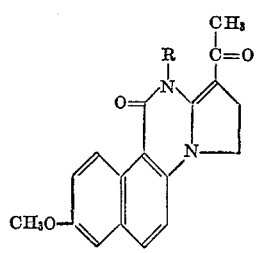

where R is hydrogen or acetyl.

2. A compound as claimed in claim 1, where R is hydrogen, being the compound 1-acetyl-2,3-dihydro-8-methoxybenzo[f]pyrrolo[1,2-a]quinazolin-11(12H)-one.

3. A compound as claimed in claim 1, where R is acetyl, being the compound 1,12-diacetyl-2,3-dihydro-8-methoxybenzo[f]pyrrolo[1,2-a]quinazolin-11(12H)-one.

4. 2,3 - dihydro - 8 - methoxybenzo[f]pyrrolo[1,2 - a]-quinazolin-11(1H)-one.

5. A pharameutically acceptable acid addition salt of the compound of claim 2.

6. A saft as claimed in claim 9, where the salt is the hydrochloride.

No references cited.

NICHOLAS S. RIZZO, *Primary Examiner.*

R. V. RUSH, *Assistant Examiner.*

U.S. Cl. X.R.

260—465, 326.5, 999